Dec. 16, 1958
J. G. A. DE GRAAF ET AL
2,864,458
LIQUID-ELECTROSTATIC PRECIPITATION
Filed July 30, 1956
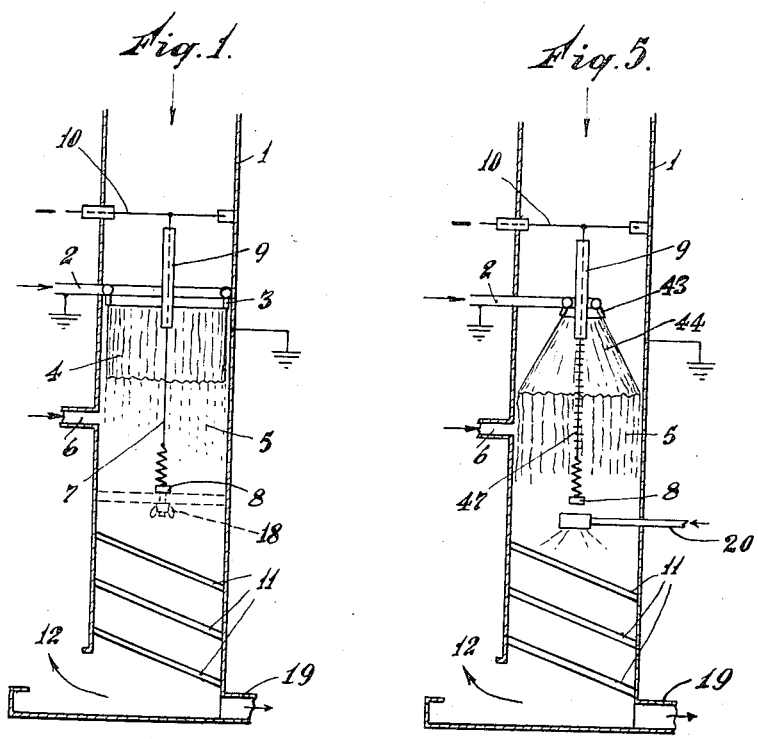
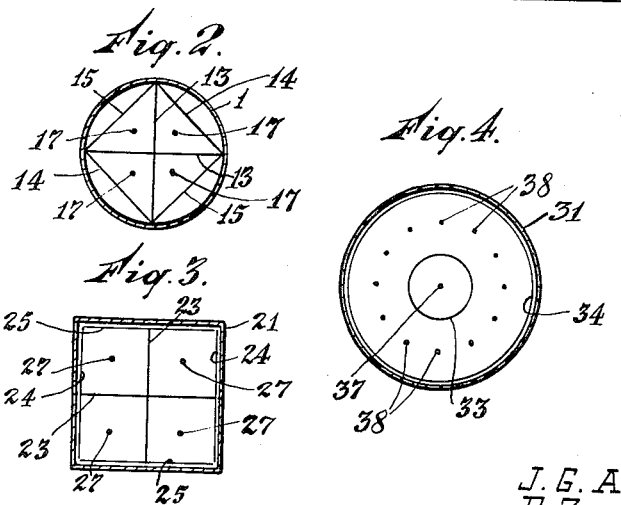
J. G. A. DE GRAAF,
D. ZAALBERG,
A. H. DE HAAS VAN DORSSER,
INVENTORS.
BY Hugh A. Kirk
ATTY.

United States Patent Office 2,864,458
Patented Dec. 16, 1958

2,864,458
LIQUID-ELECTROSTATIC PRECIPITATION

Johannes Gerardus Adrianus De Graaf, Rijswijk Z. H., and Arend Hubregt de Haas Van Dorsser and Dick Zaalberg, The Hague, Netherlands, assignors to Maschinenfabriek Kiekens N. V., Landsmeer, Netherlands, a corporation of the Netherlands Application July 30, 1956, Serial No. 600,829
Claims priority, application Netherlands August 2, 1955
11 Claims. (Cl. 183—7)

This invention relates to an apparatus for removing dust and/or liquid particles from a gas. More particularly, it deals with an electrostatic precipitation device having a liquid collecting electrode.

Previously electrostatic precipitators often lost efficiency due to decreases in their electrostatic fields caused by contamination or pollution of the collector plates or electrodes with the particles being removed from the gas being purified. This disadvantage had been overcome by mechanical means of scraping the plates or electrodes which in turn recontaminated the gas, or by washing the plates with a film of liquid such as water as in the so-called wet Cottrell electrostatic precipitator (see page 1042 and Fig. 136 of John H. Perry's "Chemical Engineers Handbook," (1950)). This washing of the collecting electrodes has the disadvantage that fewer particles reached the electrode and a longer electrostatic chamber is required for the same percentage of particle removal from the gas being purified. Charged water sprays in electrostatic precipitators have also been employed, for example, (see U. S. Patent No. 2,357,354), but they either had the disadvantage of contaminating the charged spray nozzles with the particles to be removed, or produced unfavorable electrostatic fields which decreased the overall efficiency of the precipitator.

Accordingly, it is an object of this invention to produce a simple, efficient, effective, economic, safe, compact and fast operating electrostatic precipitation apparatus for the purification of gases containing particles of dust or liquid, which does not have the above mentioned disadvantages of the prior art processes and apparati.

Another object is to produce apparatus in which coarser particles may be removed than can be removed in prior art electrostatic precipitators wtihout pollution or contamination of the walls of the precipitator, its electrodes, or spraying nozzles.

Another object is to produce apparatus having a liquid collecting electrode and is adaptable for the purification of all types of gases including those containing vapor and liquid particles as well as solid particles or dust and the like.

Another object is to produce apparatus in which the electrostatic field is the strongest between the charging electrode and the liquid collecting electrode and is weakest between the charging electrode and the nozzle for producing said liquid collecting electrode.

Another object of this invention is to produce such a purifying apparatus in which the gas being purified is simultaneously washed by the liquid forming one of the electrodes.

Another object is to produce apparatus in which the charging of the particles in the gas to be purified only takes place after the gas has passed the nozzle for producing the liquid collecting electrode.

Another object is to produce apparatus in which a liquid film serves as a collecting electrode, which film is spaced from the walls of the apparatus and prevents them from being contaminated with particles removed from the gas being purified.

Another object is to produce apparatus in which a liquid film collecting electrode may take any of a plurality of different shapes, all of which are spaced from the walls of the apparatus and all of which shapes completely surround one or more charging electrodes in the apparatus.

Generally speaking, this invention comprises passing a gas contaminated with particles successively along a continuous film of a liquid secondary charging and primary collecting electrode, then between a first charging electrode and said liquid collecting electrode film, which film then divides into droplets which increase the surface of the collecting electrode as well as decrease the distance between the electrode liquid and the particles in the gas being purified, and finally separating the charged electrode liquid droplets from the purified gas.

The apparatus may comprise a chamber with sidewalls, and an inlet for the gas at one end thereof, and an outlet for the purified gas at the other end thereof. In this chamber there is provided a nozzle for producing a film or curtain of an electrical conductive liquid, such as water, which liquid is charged with the potential of the collecting electrode of the apparatus. This film is formed near the gas inlet of the chamber to be spaced from the walls of the chamber and to surround at least one charging electrode, which charging electrode is not exposed to the gas to be purified until after the liquid collecting electrode film has been formed. The charging electrode preferably is made of a solid electrical conductor, such as a metal wire or rod and may be suspended in the chamber by insulators to be below the nozzle for forming the collecting electrode and be inside its continuous walls of its film or curtain of the liquid. The voltage of the charges between the collecting and charging electrode, may vary for different types of apparatus without departing from the scope of this invention. The nozzle for producing the liquid collecting film is such that at least during the first portion of the path of the liquid from the nozzle, it forms a continuous curtain or film and then thereafter breaks up or is broken up into droplets, which breaking up of the film and mixing of the droplets with the gas to be purified, may be insured by introducing into the chamber transversely of the film currents or jets of gas or air. The charged droplets of the collecting electrode liquid with the impurities from the gas therein, are then separated from the gas passing through the apparatus, such as on a drainboard or other drop collector, and the purified uncharged gas is removed from the chamber.

The formation of the collecting film with its collecting electrode charge thereon, and exposing it to the gas to be purified before the gas passes the charging electrode, produces the weakest electrostatic field between the nozzle for producing the film and the charging electrode thereby preventing contamination of the nozzle with charged particles from the gas. The spacing of the liquid collecting electrode from the walls of the chamber also prevents the contamination of the walls by the charged particles from the gas. Since the collecting electrode is a liquid, even larger and uncharged particles as well as the charged particles are collected thereby and are continuously washed down and removed from the apparatus, so that a clean electrostatic collecting liquid electrode is always present for the fresh gas as it enters the apparatus. Although the walls of the chamber are usually charged similarly to that of the collecting electrodes, these walls are not contaminated or polluted by particles in the gas being purified in the apparatus of this invention, in that these walls are continuously spaced from the charging electrode by a continuous film of liquid of the collecting electrode and/or droplets thereof, which droplets readily bounce off of the walls of the chamber, if they contact the walls at all.

The curtain or film of the liquid collecting electrode of this invention may take many different shapes and may be projected upwardly, downwardly, horizontally or slantwise in the chamber either as a flat or a bent curtain, which is formed into a cylinder or a cone around the charging electrode, or into a three or more sided pyramid or prism around the charging electrode, including the formation of a plurality of such figures dividing the chamber into parallel compartments each of which compartments contains a charging electrode.

The above mentioned and other features or objects of this invention and the manner of attaining them will become more apparent and the invention itself will be best understood by reference to the following description of embodiments of the invention taken in conjunction with the accompanying drawing, wherein:

Fig. 1 is a schematic vertical section of one embodiment of a liquid-electrostatic precipitator according to this invention, showing a cylindrical liquid collecting electrode around a single axially suspended charging electrode;

Fig. 2 is a schematic plan or top view of an apparatus similar to that shown in Fig. 1, but of another embodiment in which the liquid collecting electrode film is divided into four interfitting right angle triangular prisms with four equally spaced charging electrodes extending through the center of each prism;

Fig. 3 is a schematic plan view similar to Fig. 2 of another embodiment of a square sectioned apparatus according to this invention in which the liquid collecting electrode is divided into four equal square prisms with four separate charging electrodes suspended through the centers of each of said prisms;

Fig. 4 is a schematic plan view similar to Fig. 2 of still another embodiment of this invention in which the liquid collecting electrode film comprises two concentric cylinders with a central axial charging electrode and a ring of other charging electrodes spaced between the inner and outer concentric collecting electrode films; and Fig. 5 is a schematic vertical section of still another embodiment of the invention having a chamber similar to that shown in Fig. 1, in which the liquid collecting electrode film is formed as a cone with an axial central charging electrode having protuberances thereon and an additional spray nozzle in the chamber.

Referring now to the embodiment shown in Fig. 1 there is schematically illustrated a precipitator apparatus comprising a chamber 1 with vertical cylindrical walls of an electrical conductive material which are shown to be grounded, or herein to have the same potential as that of the collecting electrode of the precipitator. The gas to be purified is introduced into the upper open end of the chamber 1 as indicated by an arrow, passes downwardly through the chamber, and is removed out one side of the bottom through an outlet 12, as indicated by another arrow. An electrical conductive liquid, such as water, which is to form the liquid collecting electrode of this apparatus, is shown herein to be introduced into a grounded duct 2 at one side of the grounded chamber 1 below or spaced away from the intake for the gas. This duct 2 inside the chamber 1 is connected to a nozzle 3 which produces a cylindrical continuous liquid film or curtain 4, which film also has the charge of the ground or the more positive of the two electrodes, so that it will attract and collect the more negatively charged particles to be removed from the gas passing through the apparatus. This continuous film 4 is spaced inwardly from the grounded walls of the chamber 1 as well as outwardly from the center portion of the chamber. After this film has passed the first exposed portion of the charging electrode 7 in the chamber it is broken up or disintegrated into droplets 5 before the liquid therein is removed from the gas in the chamber. In the region in which the film 4 disintegrates into droplets 5, and possibly also to insure this disintegration, a transverse current or jet of gas or air may be introduced into the chamber 1 through a duct 6 which also agitates the droplets for their more thorough mixing with the gas to be purified. This air agitating stream may be introduced through an annular ring of orifices or jets around the inside of the chamber 1, or by any other means for agitating these droplets, as desired, which agitation preferably also occurs before the end of the charging electrode 7. This mixing of the charged collecting liquid electrode droplets with the gas being purified, decreases the distances between the oppositely charged particles to be removed from the gas, so that many more of such undesirable particles are collected and removed.

The charging electrode rod or wire 7 is herein shown suspended axially vertically downwardly in the chamber 1 from above the duct 2 and nozzle 3 by a conductor 10 extending diametrically across the upper part of the chamber 1 so that its supporting conductor 10 will not disrupt the continuity of the collecting liquid electrode film 4. This conductor 10, since it has a different charge than that of the walls of chamber 1, is mounted in insulators in the wall of the chamber 1. In order to prevent the particles in the gas to be purified from becoming charged until after they have passed the nozzle 3, the electrode 7 is surrounded by an insulator 9 which extends from above or before the nozzle 3 to below or beyond the nozzle 3, so that the weakest part of the electrostatic field in the chamber occurs at the nozzle 3 to prevent this nozzle from being polluted or contaminated with any of said particles in the gas. This suspended charging electrode 7 may be held vertically in place by a spring and/or weight 8 at its lower end, or it may be rigidly mounted by a diametrically extending insulator 18 (shown in dotted lines) which also may have an adjustable tensioning means thereon, if the electrode 7 is a wire. This charging electrode is made of an electrical conducting material preferably a metal, such as tungsten, which will not corrode or react with the liquid or vapors from the liquid collecting electrode or in the gas being purified.

At the lower or outlet end of the chamber 1 there may be provided a plurality of collecting electrode liquid droplet troughs, trays or catchers 11 for collecting and removing the charged liquid droplets contaminated with the particles collected from the gas being purified from the gas in the chamber before it passes through the outlet 12. These troughs 11 also free the gas from any electrical charge, and the liquid drops collected therein may be combined and drained from the bottom of the chamber 1 through a liquid outlet duct 19.

Referring now to Fig. 2, there is schematically shown a top view of a cylindrical type precipitator having a chamber 1 similar to that shown in Fig. 1, but instead of the nozzle 3 being circular as shown in Fig. 1 it comprises a pair of crossed diametrically extending or mutually perpendicular nozzles 13 and two perpendicular pairs of spaced straight parallel nozzles 14 and 15 connecting the ends of the nozzles 13. Thus, the freely falling films or curtains of the liquid collecting electrodes formed by these nozzles 13, 14 and 15 produce four similar right angle triangular prisms, the upper ends of which conform with the pattern of the nozzle shown in Fig. 2. In the center of each one of these prisms is suspended a vertically straight charging electrode 17, so that four parallel channels are provided for the gas passing through the chamber 1.

Instead of forming triangular shaped prisms by the curtain or film of the liquid collecting electrode as shown in Fig. 2, square shaped prisms may also be formed as shown in Fig. 3 inside of a chamber 21 of a square shaped cross-section. Two straight perpendicular nozzles 23 are arranged to bisect the chamber into four equal square parts, with two pairs of straight nozzles 24 and 25 spaced inwardly from and extending along the sides of the chamber 21. Suspended through the centers of each of the four square prism collecting electrode films formed by the nozzles 23, 24 and 25, are the charging electrodes 27.

Still another configuration of the nozzles and charging electrodes is shown in Fig. 4, wherein a plan view of slightly larger cylindrical chamber 31 is schematically shown which chamber has therein two concentric ring nozzles 33 and 34 with the outer ring nozzle 34 being spaced slightly inwardly from the inside of the walls of the chamber 31. In the center of the inner ring nozzle 33 there is provided an axially suspended electrode 37 (similar to electrode 7 shown in Fig. 1), and then spaced about halfway radially between the nozzles 33 and 34 is a ring of a plurality of suspended electrodes 38. Thus, the liquid collecting electrodes form two concentric cylindrical liquid films or curtains freely falling from the nozzles 33 and 34, and the electrodes 37 and 38 are suspended between them in such a manner that a substantially uniform electrostatic field is produced throughout the chamber 31.

Referring now to Fig. 5, there is shown still another embodiment similar to the schematic showing of Fig. 1, wherein a different type of nozzle 43 is provided on the duct 2 in which produces a slanting or conical collecting electrode film 44 which breaks into droplets 5 just before contacting the inner walls of the chamber 1. In this embodiment the central charging electrode 47 is shown to have protuberances for the production of corona discharges into the electrostatic field in the chamber. Furthermore, if desired, there may be provided in the portion of the chamber in which the droplets 5 are produced and mixed by air introduced through the duct 6, a liquid spray nozzle 20 for further mixing and increasing the liquid collecting droplets by providing a greater liquid surface upon which the particles in the gas being purified may collect.

The shape of the liquid film or curtain providing the collecting electrode in the electrostatic precipitator of this invention may take many different shapes, provided its surface is substantially continuous for a distance between the nozzle forming the film and the exposure of the film to the charging electrode in order that the nozzle is not in the strongest electrostatic field in the chamber so that said nozzle will not become contaminated by any particles in the air to be purified passing through the chamber. This spacing of the nozzle above the first exposure of the charging electrode is important in each of the embodiments of this invention, including those shown in Figs. 2, 3 and 4.

It is to be understood that any one of the above embodiments, modifications, or features may be combined with other embodiments of precipitators without departing from the scope of this invention.

The gases or vapors which may be purified in the process and apparatus of this invention can be of very different natures, including, for example; air, flue gas, waste gases of chemical plants including sulfuric acid plants, coke ovens, and the like; and the dusts removed from the gases may include cement dust, soot dust, tobacco dust, paint dust, coca powder, etc., In order to illustrate the advantages of this invention over some of the processes and apparati of the prior art previously mentioned, reference is had to the following table of comparative tests thereof for the removal of particle sizes between 3 and 7 microns from air in which it was suspended:

*Table of comparative tests*

| Velocity of Contaminated Air in Meters Per Second Passed Through the Apparatus | Quantity of Said Air in Cubic Meters Per Hour | Quantity of Dust in Grams Per Cubic Meter In said Air | The Percentage of Particles Removed From Said Air | | |
|---|---|---|---|---|---|
| | | | Precipitator According to U. S. Patent No. 2,357,354 | Wet Cottrell Apparatus Described in Perry's Handbook | Apparatus According to Fig. 3 of Present Invention |
| 3.5 | 900 | 13 | 67 | 95 | 95 |
| 7 | 1,800 | 9 | 38 | 67 | 95 |
| 13.5 | 3,500 | 6 | 8 | 50 | 95 |

The foregoing specific examples show that with a low velocity of flow of air (3.5 m./sec.) the percentage of dust collected with the wet Cottrell apparatus is the only one which compares favorably with the method and apparatus according to this invention. However, as the velocity of the air increases, the percentage of dust removed from the air according to the present invention is much greater than that for either of the other apparati tested; the percentage of dust removed remaining the same at all velocities tested for the apparatus of the present invention.

While there is described above the principles of this invention in connection with specific apparatus, it is to be clearly understood that this description is made only by way of example and not as a limitation to the scope of this invention.

What is claimed is:

1. An electrostatic precipitator for purifying a fluid comprising: a vertically supported elongated charging electrode, a vertical tubular chamber surrounding said electrode, nozzle means in said chamber above said charging electrode and between the axis of said charging electrode and the inner walls of said chamber, a freely falling conductive liquid film collecting electrode produced and directed by said nozzle means to be coaxial with said charging electrode and spaced from said walls of said chamber, means for passing said fluid to be purified through said chamber from its top to its bottom between said charging electrode and said collecting electrode, and means below said charging electrode for separating the resulting contaminated liquid of said collecting electrode from said fluid.

2. A precipitator according to claim 1 wherein said electrodes are arranged so that the electrostatic field between said electrode is weakest between said charging electrode and said nozzle and is strongest between said charging electrode and said collecting electrode.

3. A precipitator according to claim 2 including means for breaking up said film into droplets only after it is in the strongest electrostatic field.

4. A precipitator according to claim 1 wherein said collecting electrode film comprises a plurality of parallel fluid channel sections, and wherein a said charging electrode is located in each of said sections.

5. A precipitator according to claim 1 wherein said charging electrode is provided with protuberances for producing corona discharges therefrom.

6. An electrostatic precipitator comprising: a hollow vertical columnar chamber, means for passing a gas containing particles to be removed therefrom downwardly through said chamber from the top to the bottom thereof, a first solid charging electrode of one polarity extending coaxially of said chamber and located centrally of said chamber, a liquid nozzle means having a charge of an opposite polarity with respect to said first charging electrode and located in said chamber above said first charging electrode, said nozzle producing a freely falling film of conducting liquid charged oppositely from said first charging electrode, said film being spaced from both the walls of said chamber and said first charging electrode in said chamber surrounding and coaxial with said first charging electrode, and acting as both a secondary charging and a primary collecting electrode for the particles in the gas passed through said chamber, and means below said first charging electrode for separating the resulting particle contaminated liquid from said gas.

7. An electrostatic precipitator for purifying a liquid containing particles, comprising: a vertically supported elongated charging electrode, nozzle means near the upper end of said charging electrode and surrounding the axis of said charging electrode, a freely falling conductive liquid film forming an oppositely charged liquid electrode produced and directed by said nozzle means to be coaxial with and surrounding said charging electrode, said film breaking up into droplets after passing at least part of said charging electrode whereby said droplets collect said particles, means for passing said fluid to be purified inside said surrounding film from the top to the bottom of said film and around said charging electrode, and means below said charging electrode for separating the resulting contaminated liquid droplets of said collecting electrode from said fluid.

8. A precipitator according to claim 7 including means for breaking up said film into droplets only after it is in its strongest electrostatic field.

9. A precipitator according to claim 7 wherein said collecting electrode film comprises a plurality of parallel fluid channel sections, and wherein a said charging electrode is located in each of said sections.

10. A precipitator according to claim 7 wherein said charging electrode is provided with protuberances for producing corona discharges therefrom.

11. An electrostatic precipitator comprising: a hollow vertical columnar chamber, means for passing a gas containing particles to be removed therefrom downwardly through said chamber from the top to the bottom thereof, a first solid charging electrode of one polarity extending coaxially of said chamber and located centrally of said chamber; a liquid nozzle means having a charge of an opposite polarity with respect to said first charging electrode and located near the upper end of said first charging electrode, said nozzle producing a freely falling film of conducting liquid charged oppositely from said first charging electrode, said film being spaced from both the walls of said chamber and said first charging electrode in said chamber surrounding and coaxial with at least the upper part of said first charging electrode, said liquid in said film acting first as a secondary charging electrode and then when said film breaks up into droplets as a collecting electrode for the particles in the gas passed through said chamber, and means below said first charging electrode for separating the resulting particle contaminated liquid droplets from said gas.

References Cited in the file of this patent
UNITED STATES PATENTS

| | | |
|---|---|---|
| 1,297,598 | Shawvan | Mar. 18, 1919 |
| 1,325,136 | Bradley | Dec. 16, 1919 |
| 2,171,617 | Wintermute | Sept. 5, 1939 |
| 2,192,249 | White | Mar. 5, 1940 |